United States Patent
Fuchs

(10) Patent No.: US 8,402,871 B2
(45) Date of Patent: Mar. 26, 2013

(54) RECEIVING AND GUIDING DEVICE FOR RECEIVING A WORK PIECE AND GUIDING A CUTTING TOOL

(75) Inventor: Rudolf Fuchs, Neuhausen (DE)

(73) Assignee: Robert Bosch GmbH, Stuttgart (DE)

( * ) Notice: Subject to any disclaimer, the term of this patent is extended or adjusted under 35 U.S.C. 154(b) by 681 days.

(21) Appl. No.: 12/375,171

(22) PCT Filed: Feb. 6, 2008

(86) PCT No.: PCT/EP2008/051462
§ 371 (c)(1),
(2), (4) Date: Jan. 26, 2009

(87) PCT Pub. No.: WO2008/119580
PCT Pub. Date: Oct. 9, 2008

(65) Prior Publication Data
US 2010/0132531 A1    Jun. 3, 2010

(30) Foreign Application Priority Data
Mar. 29, 2007   (DE) .......................... 10 2007 015 091

(51) Int. Cl.
*B62D 7/02* (2006.01)
(52) U.S. Cl. .............................. 83/454; 83/466; 83/468.3
(58) Field of Classification Search .................... 83/454, 83/455, 880, 613, 452, 453, 468.1, 468.2, 83/468.3, 468.4
See application file for complete search history.

(56) References Cited

U.S. PATENT DOCUMENTS

| | | | | |
|---|---|---|---|---|
| 2,706,002 A | * | 4/1955 | Whittamore | 83/885 |
| 2,818,892 A | * | 1/1958 | Price | 83/454 |
| 3,151,641 A | * | 10/1964 | Stanley et al. | 83/454 |
| 4,096,777 A | | 6/1978 | Adams | |
| 4,685,369 A | | 8/1987 | Beamer | |
| 5,713,260 A | * | 2/1998 | Thiele et al. | 83/863 |
| 7,299,731 B2 | * | 11/2007 | Schulz | 83/614 |
| 2002/0096031 A1 | * | 7/2002 | Yang | 83/614 |
| 2003/0140761 A1 | * | 7/2003 | Schulz | 83/614 |
| 2004/0226426 A1 | * | 11/2004 | Tseng | 83/455 |
| 2005/0028663 A1 | * | 2/2005 | Volfson | 83/651 |
| 2005/0109180 A1 | * | 5/2005 | Schultz et al. | 83/455 |
| 2005/0199116 A1 | * | 9/2005 | Loibl | 83/607 |
| 2007/0173394 A1 | * | 7/2007 | Lee | 493/68 |

FOREIGN PATENT DOCUMENTS

| | | |
|---|---|---|
| DE | 199 04 874 | 10/1999 |
| DE | 101 07 847 | 9/2002 |
| EP | 0 674 962 | 10/1995 |
| SU | 466078 | 4/1975 |
| SU | 1703297 | 1/1992 |

* cited by examiner

*Primary Examiner* — Sean Michalski
(74) *Attorney, Agent, or Firm* — Michael J. Striker

(57) ABSTRACT

A receiving and guiding device for receiving a work piece and guiding a cutting tool has a receiving frame with a bearing surface for the work piece, a guide rail for the cutting tool, which guide rail is displaceable between a functional position and a non-functional position, and in the functional position is located above the bearing surface and the receiving frame, and a support arm supporting the guide rail in the functional position, wherein the support arm and the guide rail are moveable relative to one another.

20 Claims, 7 Drawing Sheets

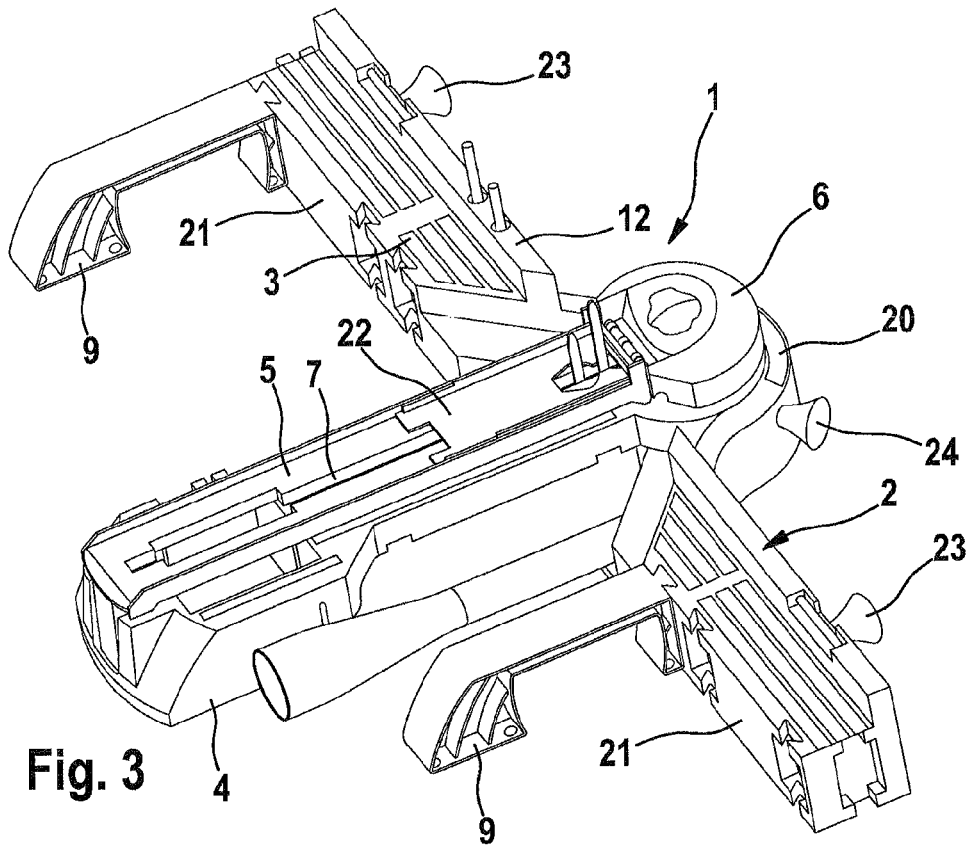
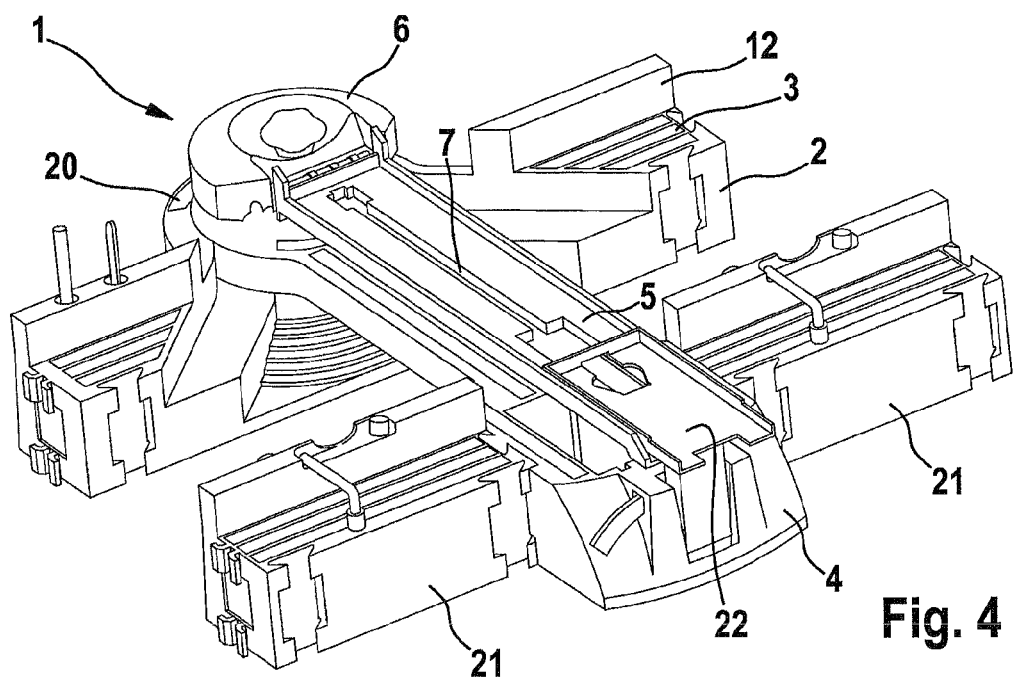

RECEIVING AND GUIDING DEVICE FOR RECEIVING A WORK PIECE AND GUIDING A CUTTING TOOL

CROSS-REFERENCE TO RELATED APPLICATION

The invention described and claimed hereinbelow is also described in German Patent Application DE 10 2007 015 091.3 filed on Mar. 29, 2007. This German Patent Application, whose subject matter is incorporated here by reference, provides the basis for a claim of priority of invention under 35 U.S.C. 119(a)-(d).

BACKGROUND OF THE INVENTION

The present invention relates to a receiving and guiding device for receiving a work piece and for guiding a cutting tool, in particular a hand-guided tool such as a jigsaw.

Receiving and guiding devices which are used to prepare panel boards, profile boards, and parquet floor boards made of natural wood or laminate using a cutting tool, e.g. a jigsaw or a milling tool, are known. Receiving and guiding devices of this type are typically suitable only for professional use due to their large dimensions, heavy weight, and the related high procurement costs. Devices of this type are rarely used in other applications, such as by do-it-yourselfers, for reasons of cost.

SUMMARY OF THE INVENTION

The object of the present invention is to provide a receiving and guiding device for receiving a work piece and guiding a cutting tool, which has a simple design, may be used in diverse applications, and is portable.

The receiving and guiding device according to the present invention which may be used in particular for a hand-held cutting tool such as a jigsaw or a milling tool is composed of a receiving frame which is provided with a bearing surface for the work piece, a guide rail which includes a guiding device for guiding the cutting tool, and a support arm against which the guide rail bears when in the functional position. The guide rail may be switched between a functional position in which the work piece may be worked, and a non-functional position. It is also provided that the support arm and the guide rail are moveable relative to one another.

This receiving and guiding device is characterized by a compact design, and it may be transported with relatively little effort. The various components of the device may be removed, stored in a space-saving manner, and reinstalled with little effort at the work site.

The device makes it possible to cut work pieces such as panels or floor boards exactly, since the cutting tool is guided in the guide device of the guide rail. The fact that the guide rail and the support arm on which the guide rail bears when in the functional position may move relative to one another makes it possible to adapt the position of the guide rail to the work piece to be worked when the device is in the assembled state. This is made possible in particular by the fact that the support arm forms a part of the bearing surface which is provided to receive the work piece to be worked. The bearing surface is located in the receiving frame and partially on the support arm. The support arm may extend into the receiving frame and thereby form a section of the bearing surface inside the receiving frame.

The adjustability of the guide rail relative to the support arm on which the work piece bears, at least partially, is advantageously a height-adjustability which makes it possible to adapt the distance between the top side of the support arm and the underside of the guide rail to the thickness of the work piece. In the functional position, the work piece is clamped between the support arm and the guide rail. The cutting tool, e.g. the reciprocating saw, is guided—in the functional position—in the guide device of the guide rail, the saw blade of the tool extending through the guide rail and sawing through the work piece. The guide device is designed, in particular, as a guide groove, in which the saw blade or the milling tool is guided. It is also possible to guide along the side, on a side edge of the guide rail, which is the guide device in this case.

In a preferred embodiment, the guide rail is held in a manner such that it may swivel between the functional position and the non-functional position. A swivel joint is provided for this purpose, which makes it possible to swivel the guide rail relative to the support arm, while advantageously securing the guide rail and the support arm on the receiving frame. The swivel joint makes it possible in particular to swivel the guide rail about a horizontal axis.

According to a further advantageous embodiment, it is provided that the guide rail is rotatably supported on the receiving frame. The rotatability enables, in particular, a rotational motion in or parallel to the plane of the bearing surface, e.g. around an angle of +/−45° relative to the central position in which the guide rail is located, and which is orthogonal to the longitudinal direction of the bearing surface or the receiving frame. The rotatability of the guide rail is preferably tracked by the support arm. A pivot joint is provided to carry out the rotational motion. According to a preferred embodiment, the pivot joint is designed as one piece with the swivel joint which makes it possible for the guide rail to swivel upward relative to the support arm. This joint also secures the support arm and the guide rail on the receiving frame.

Advantageously, a corresponding device in the support arm is assigned to the guide device on the guide rail in order to ensure that the saw blade may extend in the vertical direction up to the support arm without damaging it. The device on the support arm is preferably also designed as a groove, into which the saw blade or the milling blade extend when work is performed.

The guide groove may be expanded at least in sections to form a guide recess which is significantly wider than the guide groove, thereby making it possible to work the work piece at an angle relative to the longitudinal axis of the guide groove, within the width of the guide recess. This makes it possible, in particular, to saw miters in the work piece. Advantageously, a recess which has been widened accordingly is formed in the support arm, within which the work piece—which extends through the guide recess—may move. As an alternative, it may also be expedient to design the support arm shorter in length, so that the guide recess in the guide rail extends past the end face of the support arm. For optimal guidance, it is expedient, however, to adapt the length of the support arm to that of the guide rail, so that the guide rail is supported entirely on the support arm.

It is also expedient to provide a fastening element such as a pin on the free end face of the guide rail, which faces away from the receiving frame, the fastening element being used for position-fixing purposes on the support arm when the guide rail is in the functional position. In this manner, the work piece to be worked may be clamped tightly in the space between the support arm and the guide rail. Optionally, a height-adjustment device for changing the height of the guide rail relative to the support arm may also be provided at this point.

The work piece bearing surfaces of the receiving frame and the support arm, and the underside of the guide rail may be provided with rubberized zones to prevent the work piece from slipping even when they are clamped.

Further advantages and expedient embodiments are depicted in the further claims, the description of the figures, and the drawings.

DESCRIPTION OF THE DRAWINGS

FIG. 3 shows the receiving and guiding device without a work piece clamped in position, FIG. 4 shows the receiving and guiding device with support blocks which have been detached from the receiving frame, and which are located to the left and right of the free end faces of the support arm and the guide rail.

DESCRIPTION OF THE PREFERRED EMBODIMENTS

Figure 1:
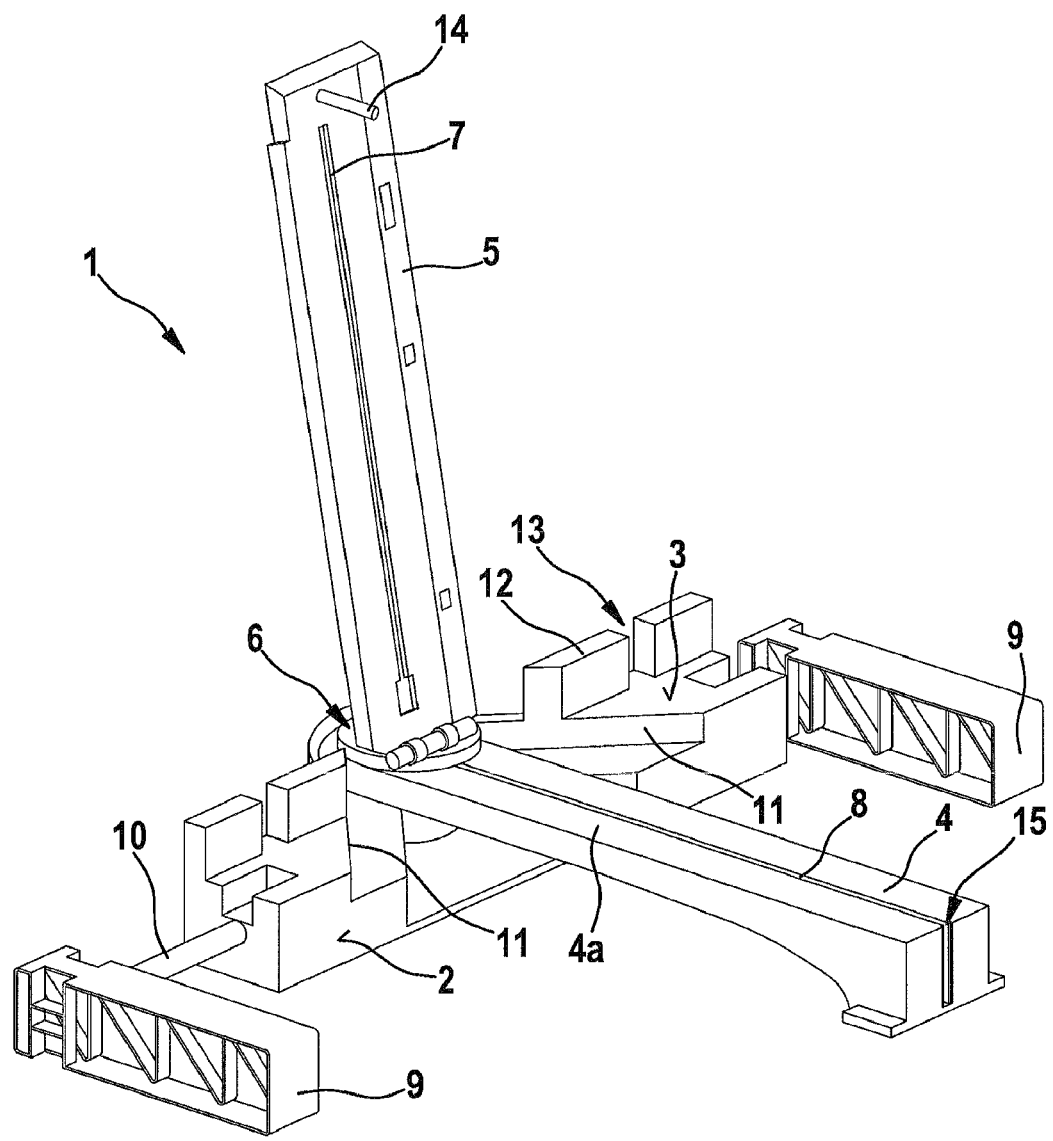
FIG. 1 shows a perspective illustration of a receiving and guiding device for receiving a work piece and for guiding a cutting tool, with a receiving frame which includes a bearing surface for the tool, a support arm which extends outwardly on the side, and a guide rail in the non-functional position, shown in the folded-upward state.

Components that are the same are labelled with the same reference numerals in the figures.

Receiving and guiding device 1 shown in FIG. 1 is used to receive a work piece and to guide a cutting tool, in particular a hand-guided tool such as a jigsaw or a milling tool, over the work piece to be worked. Receiving and guiding device 1 includes a receiving frame 2 which is provided with a bearing surface 3 for the work piece, a support arm 4, and a guide rail 5. Relative to the longitudinal axis of receiving frame 2 or bearing surface 3, support arm 4 and guide rail 5 extend orthogonally to receiving frame 2 in the situation shown in FIG. 1. Support arm 4 is used to support guide rail 5, and both components are held on receiving frame 2 via a combination swivel and pivot joint 6. Guide rail 5 is shown in FIG. 1 in its non-functional position in which it is swiveled upward. To be moved into the functional position, guide rail 5 is folded downward onto support arm 4 around a horizontal axis of swivel and pivot joint 6.

To guide the work piece, a guide groove 7 which extends in the longitudinal direction of the guide rail is formed in guide rail 5. A corresponding saw slot 8 in support arm 4 is assigned to guide groove 7. To work the work piece which has been placed on bearing surface 3, the tool extends through guide groove 7 and into saw slot 8.

End-face support blocks 9 are also provided; they are connected to receiving frame 2 via a connecting rod 10. The axial separation may be adjusted by sliding connecting rod 10 into a corresponding receptacle in receiving frame 2. Supporting blocks 9 may also be removed entirely.

Support arm 4 and guide rail 5 may be rotated using swivel and pivot joint 6 about a vertical axis relative to receiving frame 2, it being possible to rotate both of them or to rotate only the support arm or the guide rail. Swivel and pivot joint 6 is located in the region of a side edge of receiving frame 2. Support arm 4 and guide rail 5—when in the folded-down state—therefore extend transversely above receiving frame 2. The axial vertical positioning of support arm 4 is adapted to bearing surface 3 in a manner such that top side 4a of the support arm forms a portion of bearing surface 3, at least in the region of receiving frame 2.

Relative to the central position shown in FIG. 1, in which support arm 4 is positioned orthogonally to the longitudinal axis of receiving frame 2, support arm and, therefore, guide rail 5, may be rotated by an angle of, e.g. +/−45° about the vertical axis of joint 6. To limit the rotational motion, stops 11 are provided in the receiving frame, which are situated at an angle to one another and limit the maximum angular range within which support arm 4 and guide rail 5 may be rotated.

Bearing surface 3 in receiving frame 2 is bounded by a support wall 12 on one side. Several recesses 13 are formed in support wall 12, which are used to accommodate clamping devices for clamping the work piece.

A mandrel or pin 14 is located on the underside of guide rail 5 in the region of the free end face, and extends into an assigned recess 15 in support arm 4 when guide rail 5 is folded down, thereby providing an additional means for locking the guide rail in position.

Figure 2:
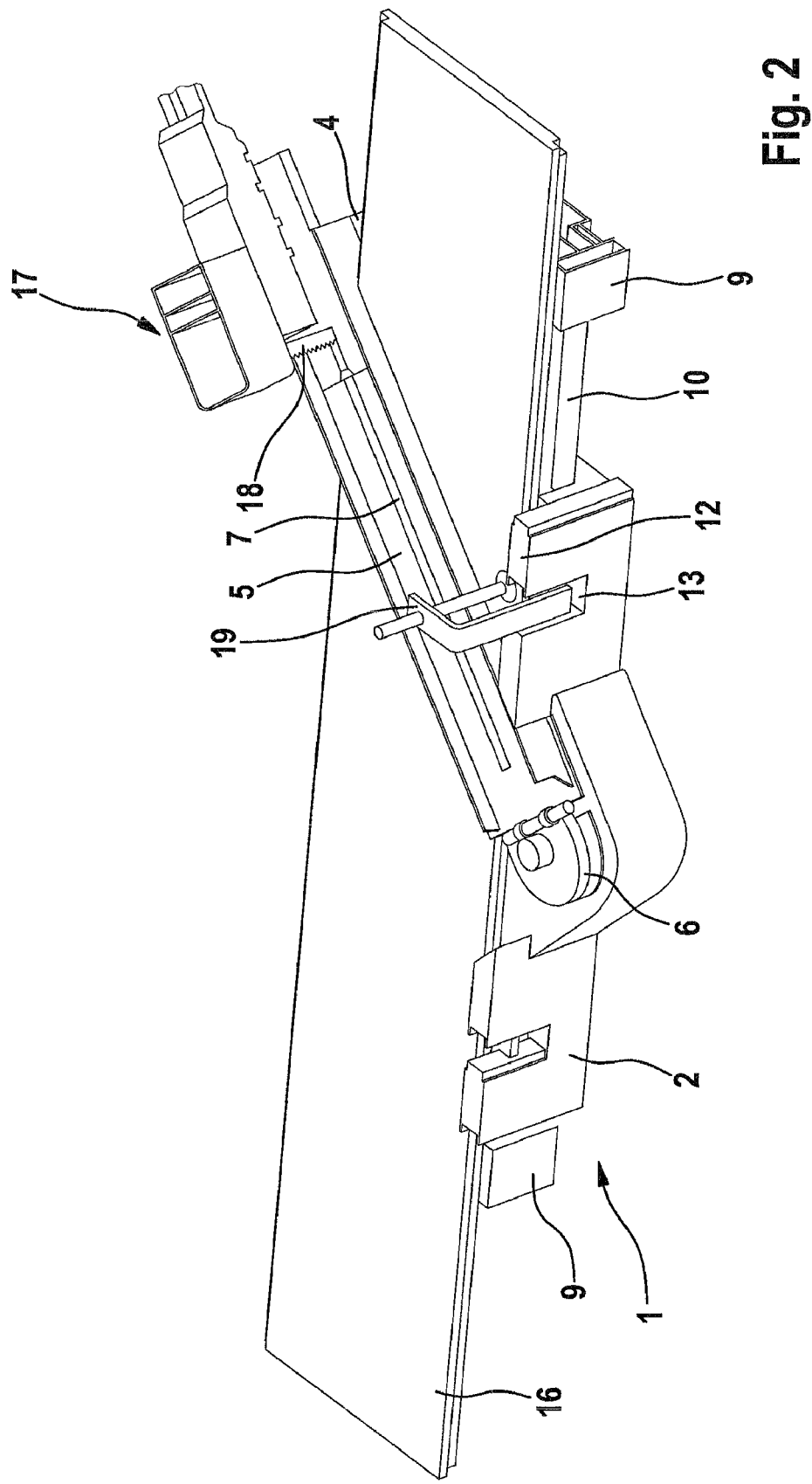
FIG. 2 shows the receiving and guiding device in the functional position in which a work piece is clamped between the support arm and the guide rail; a jigsaw has been placed on the top side of the guide rail and is guided along a guide groove in the guide rail.

In FIG. 2, guide rail 5 is shown folded-down, in its functional position in which it rests on support arm 4. A work piece 16 to be worked, e.g. a wooden panel, rests on bearing surface 3 of receiving frame 2. A hand-guided cutting tool 17, in particular a jigsaw, is placed on guide rail 5. Saw blade 18 of hand-guided cutting tool 17 extends into guide groove 7 in guide rail 5. Work piece 16 is clamped between support arm 4 and guide rail 5. In the embodiment shown in FIG. 2, support arm 4 and guide rail 5 are both rotated about the vertical axis of swivel and pivot joint 6, and they are located in a slanted position relative to the longitudinal axis of receiving frame 2, with a deflection of approximately 45° relative to the orthogonal central position.

A clamping device 19 in also shown in FIG. 2, which is inserted in a recess 13 in support wall 12 of receiving frame 2 and clamps work piece 2 tightly onto the bearing surface.

FIGS. 3 and 4 show a modification of receiving and guiding device 1. Receiving frame 2 of the receiving and guiding device includes two bearing blocks 21 which are designed as separate components and may each be placed on an end face, and via which bearing surface 3 may be extended in the axial direction. Using a fixing device 23, bearing block 21 may be fixed in position on the center part of receiving frame 2. As shown in FIG. 3, support blocks 9 may be located on the center section of receiving frame 2 or on one of the receiving blocks 21.

As shown in FIG. 4, bearing blocks 21 may also be detached from the central section of receiving frame 2 and located, e.g. in the region of the free end face of support arm 4 and guide rail 5. This makes it possible to place a further work piece on the bearing surface of bearing blocks 21 parallel to the work piece which has been placed on bearing surface 3 of receiving frame 2.

Swivel and pivot joint 6 is inserted in a semicircular bearing receptacle 20 which is designed as a single piece with receiving frame 2. Bearing receptacle 20 extends in the transverse direction past side wall 12 of receiving frame 2. A fixing device 24 is located on bearing receptacle 20, via which the current angular position of swivel and pivot joint 6 may be locked in position relative to a rotation about the vertical axis of the joint.

In addition, a guide plate 22 is situated on the top side of guide rail 5 in a manner such that it may be displaced relative to guide groove 7. The cutting tool may be placed via its underside on guide plate 22.

Figure 5:
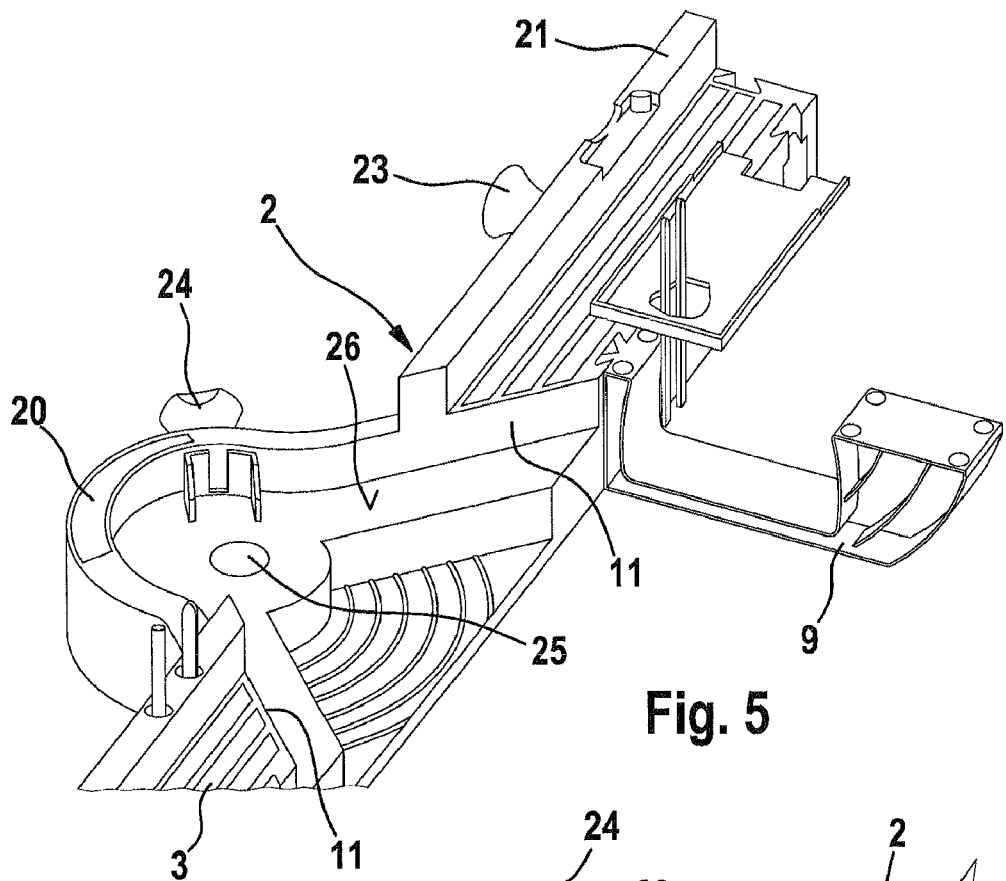
FIG. 5 shows an isolated view of the receiving frame.

Bearing receptacle 20 in receiving frame 2 is shown in detail in FIG. 5. FIG. 5 shows that a recess 25 for receiving a bearing pin or the like of swivel and pivot joint 6 is formed in the base plate of bearing receptacle 20. Base 26 of bearing receptacle 20 is bounded by the side boundary walls and stops 11 which are situated at an angle to one another, and which limit the angular deflection of support arm 4 and guide rail 5. Base 26 is situated lower than bearing surface 3, the height difference to bearing surface 3 being filled by the support arm, which rests on base 26. The support arm forms a part of the bearing surface for the work piece in this region.

FIG. 5 also shows that support block 9 may be located in the inverted position as compared with the illustration shown in FIG. 3, in a manner such that a central, U-shaped recess in support block 9 is open either downward (FIG. 3) or upward (FIG. 5).

Figure 6:
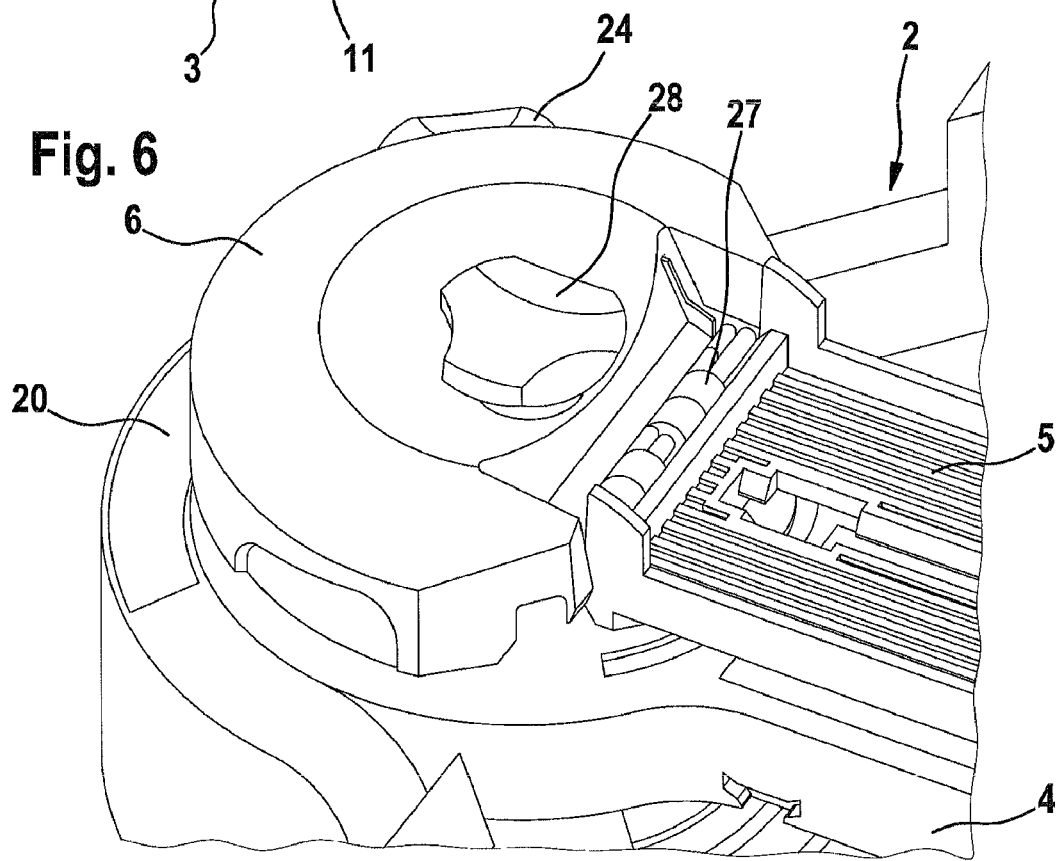
FIG. 6 shows the swivel and pivot joint, via which the guide rail and the support arm are rotatably held on the receiving arm, and via which the guide rail may swivel relative to the support arm.
Figure 7:
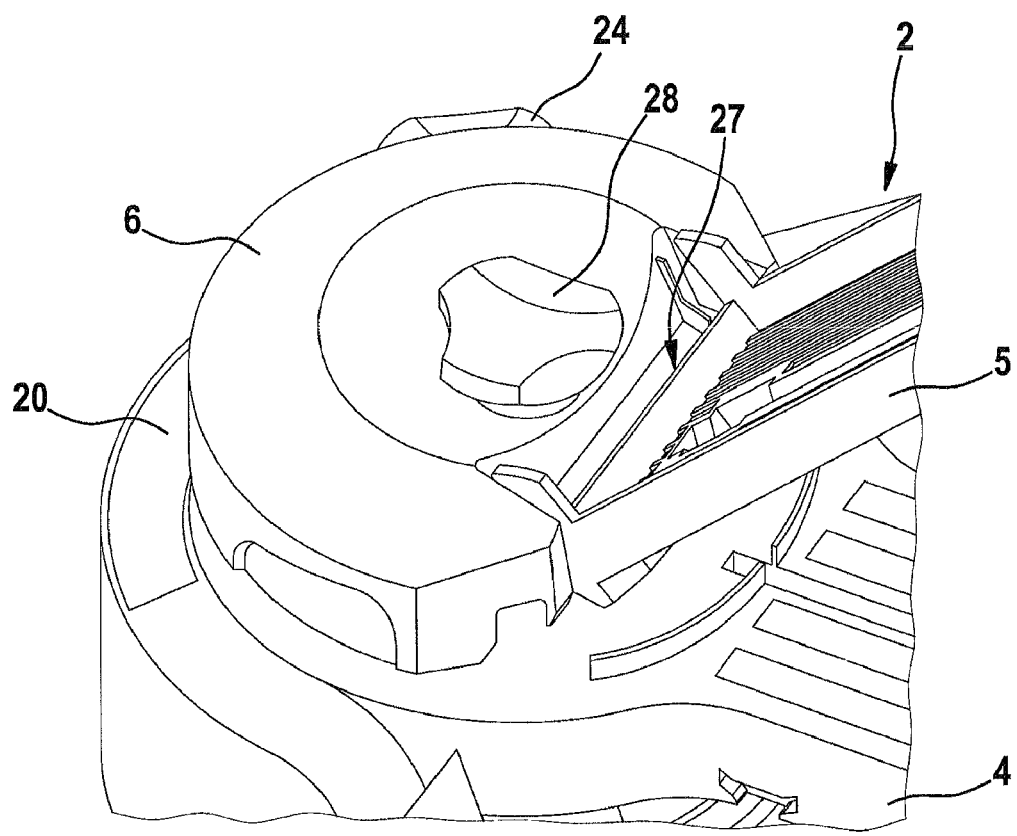
FIG. 7 shows an illustration similar to that in FIG. 6, but with the guide rail swiveled upward.

FIGS. 6 and 7 show a section of support frame 2 in the region of bearing receptacle 20 with swivel and pivot joint 6 inserted therein. Swivel and pivot joint 6 includes a hinge 27, the hinge axis of which extends horizontally, it being possible to swivel guide rail 5 via hinge 27 between a horizontally folded-down, functional position (FIG. 6) and a non-functional position (FIG. 7) which is swiveled or folded upward relative to support arm 4 located beneath it. FIGS. 6 and 7 also show a height-adjusting device 28, via which the upper part of swivel and pivot joint 6—including guide rail 5 retained thereon—may be height-adjusted relative to swivel arm 4 located beneath it. Height-adjusting device 28 is designed as an adjusting screw in particular.

Figure 8:
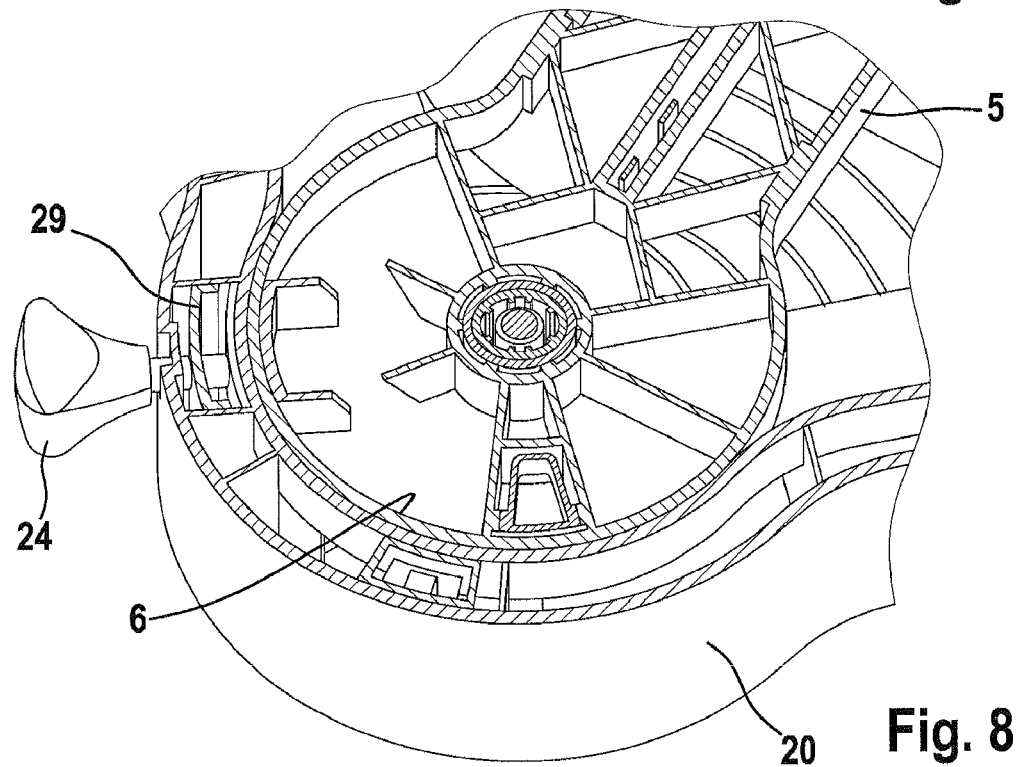
FIG. 8 shows a partially exposed illustration of the region of the swivel and pivot joint, with a fixing device for locking the angular position of the guide rail.

FIG. 8 shows an illustration of the mode of operation of the fixing device via which the current angular position of swivel and pivot joint 6 including guide rail 5 may be locked in position. Fixing device 24 is composed of an adjusting screw which extends radially into the wall of bearing receptacle 20 and displaces a clamping plate 29 radially. As a result, clamping plate 29 may be brought in contact with the inner wall of bearing receptacle 20 which encloses swivel and pivot joint 6, pressing it radially inwardly, thereby applying a radially acting friction and clamping force on swivel and pivot joint 6.

Figure 9:
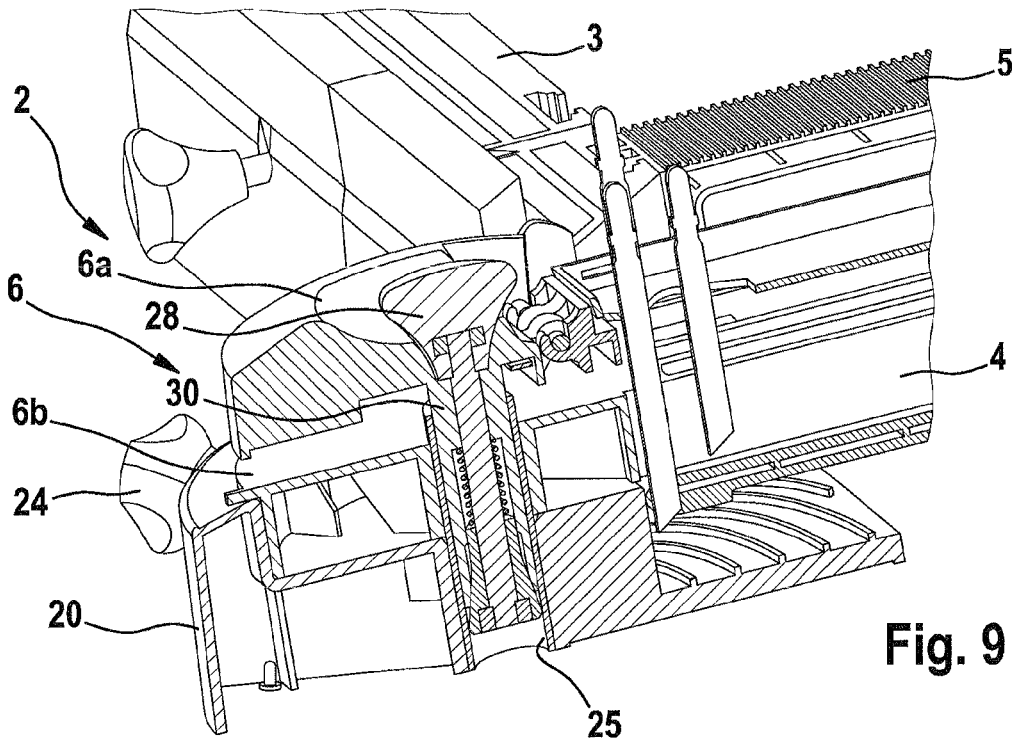
FIG. 9 shows a sectional view through the swivel and pivot joint with an adjusting screw which extends through the joint and, using which, the guide rail is height-adjustable relative to the support arm; in the position shown, the guide rail extends only slightly above the support arm.
Figure 10:
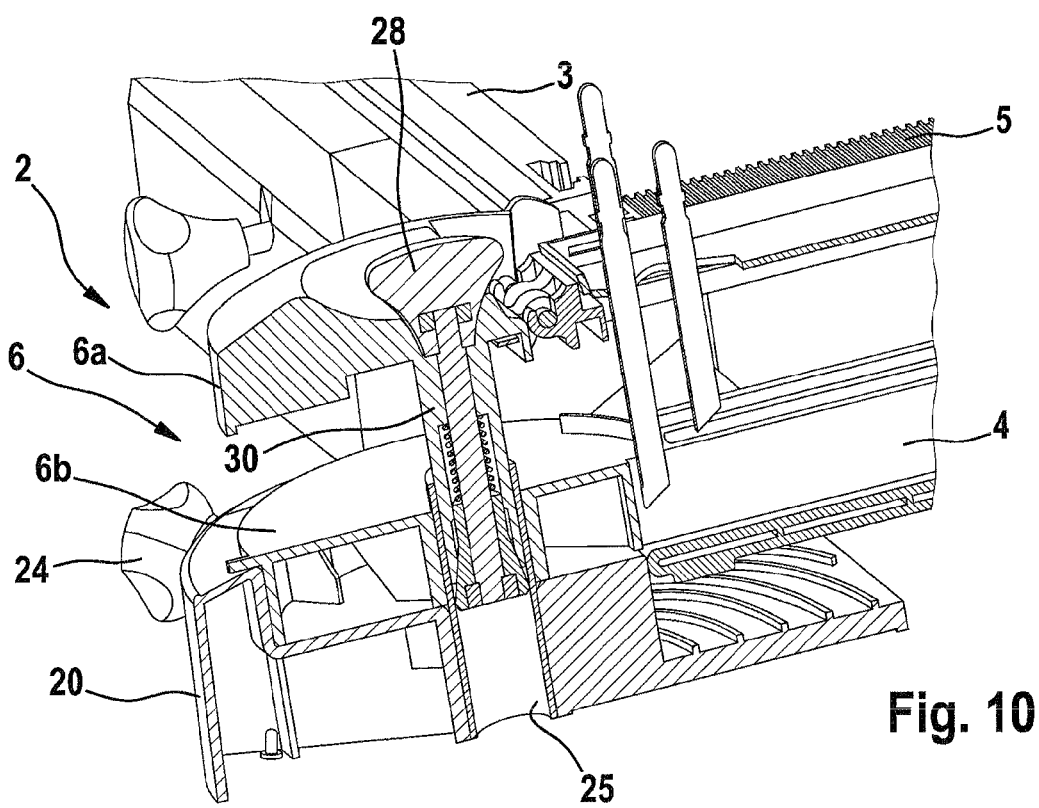
FIG. 10 shows an illustration similar to that in FIG. 9, but with the guide rail located at a greater vertical distance above the support arm.

Height-adjusting device 28 is shown in detail in FIGS. 9 and 10. In order to adjust the height of guide rail 5, swivel and pivot joint 6 is designed as two components, including an upper, height-adjustable part 6a and a lower part 6b which is inserted in bearing receptacle 20. Part 6b is rotatable about the vertical axis but is not height-adjustable. A hollow-cylindrical pivoting pin which is designed as one piece with upper part 6a of swivel and pivot joint 6 extends into recess 25 formed in bearing receptacle 20. Height-adjusting device 28 which is designed as an adjusting screw is situated in pivoting pin 30. When adjusting screw 28 is rotated, upper part 6a of swivel and pivot joint 6 moves axially upward or downward.

Figure 11:
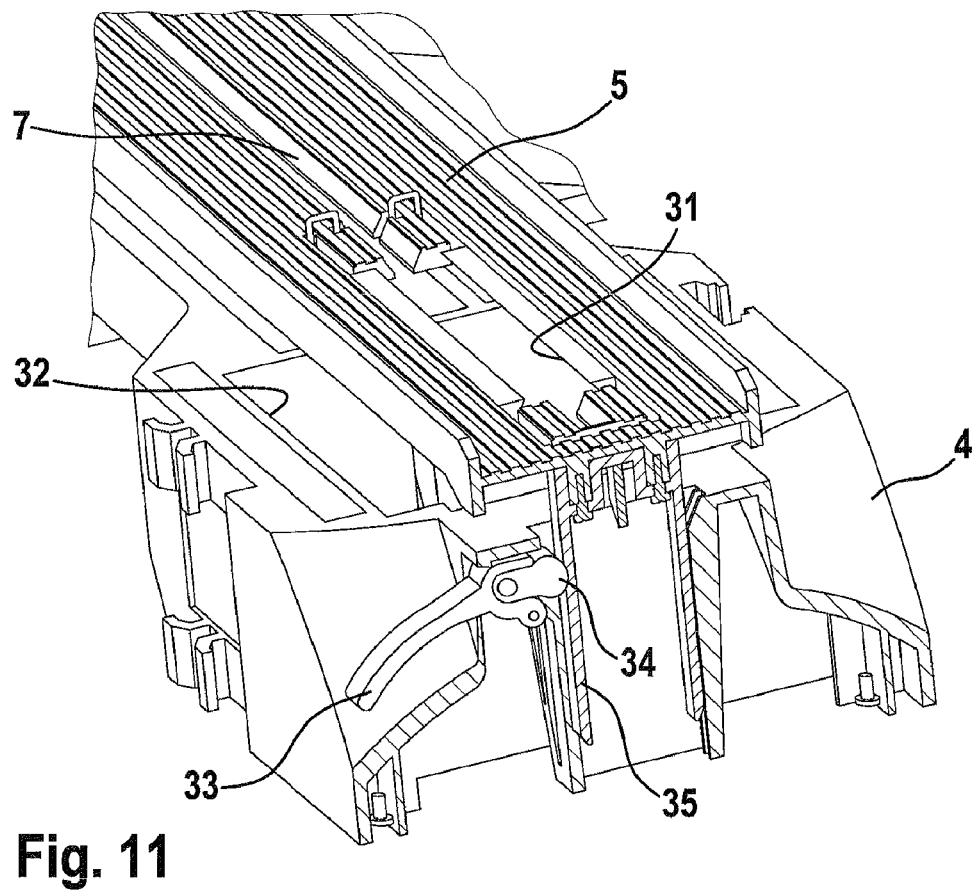
FIG. 11 shows, in a perspective view, a cross section through the end-face region of guide rail and support arm, with a locking device via which the guide rail is locked in position on the support arm.

The end-face end region of support arm 4 and guide rail 5 on the side facing away from the pivot joint is shown in FIG. 11. A widened guide recess 31 is formed in guide rail 5, adjacent to free end face. Guide groove 7 leads into widened guide recess 31 which is considerably wider than guide groove 7. A recess 32 which is located underneath and is formed in support arm 4 is assigned to guide recess 31. Guide recess 31 and recess 32 in support arm 4 make it possible to work the work piece at an angle or transversely to the direction of guide groove 7, within the width of guide recess 31.

FIG. 11 also shows—in a modified embodiment—a position-fixing device for fixing the horizontal position of guide rail 5 on support arm 4 situated beneath it. This position-fixing device is composed of a lever 33 and a clamping bolt 34 which is actuatable using lever 33. Lever 33 and clamping bolt 34 are supported and/or located on support arm 4. When lever 33 is actuated, clamping bolt 34 is pressed laterally against a rail 35 which is designed as one piece with guide rail 5 and extends vertically downward. The clamping force which may be generated via lever 33 and clamping bolt 34 is sufficient to fix guide rail 5 in position on support arm 4 with adequate security.

Figure 12:
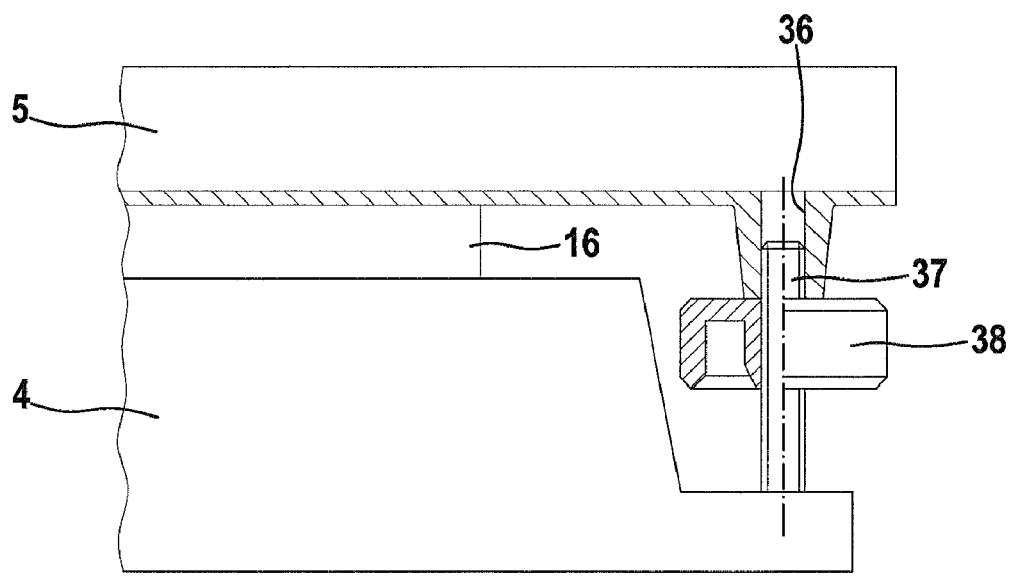
FIG. 12 shows a longitudinal sectional view through the end-face region of the guide rail and the support arm, with a fastening and height-adjusting device.

FIG. 12 shows a further embodiment for fixing guide rail 5 in position or adjusting its height relative to support arm 4 from the region of the free end face which faces away from the swivel and pivot joint. A mandrel with a recess 36 formed therein is located on guide rail 5, on the underside and in the region of the end face. Recess 36 may be slightly conical in design and is used to accommodate a threaded bolt 37 which is situated vertically and is fixedly connected to support arm 4. An adjusting wheel 38 is rotatably held on threaded bolt 37. The end face of the mandrel with receptacle 36 bears against adjusting wheel 38. When adjusting wheel 38 is rotated, the height of guide rail 5 is raised or lowered. An additional fixation means is provided via the free end face of threaded bolt 37 extending into recess 36.

What is claimed is:
1. A receiving and guiding device for receiving a work piece and guiding a cutting tool, comprising:
   a receiving frame with a bearing surface for the work piece;
   a guide rail for the cutting tool, wherein said guide rail is displaceable between a functional position and a non-functional position, and in the functional position is located above said bearing surface and said receiving frame wherein the guide rail has a free end face that faces away from the receiving frame;
   a support arm supporting said guide rail in the functional position, wherein said support arm and said guide rail are moveable relative to one another; and
   a swivel joint configured to enable a swiveling of the guide rail relative to the support arm, wherein said guide rail is held on the receiving frame via said swivel joint, wherein the swivel joint is positioned opposite to said free end face of the guide rail, wherein said swivel joint is further configured as a pivot joint adapted to carry out a rotational motion of said guide rail, and wherein both the guide rail and the support are rotatable by the pivot and swivel joint, wherein said guide rail is swivelable between the functional position and the non-functional position,
wherein said guide rail is swivelable about a swivel axis which extends horizontally, and wherein said guide rail is foldable up and down to switch between the functional position and the non-functional position,
wherein in the functional position, the work piece is clamped between the support arm and the guide rail, and wherein in the non-functional position, the guide rail is in a folded-upward position.

2. A receiving and guiding device as defined in claim 1, wherein said bearing surface is partially formed by said support arm.

3. A receiving and guiding device as defined in claim 1, wherein said guide rail is rotatable relative to a plane of said bearing surface in a manner selected from a group consisting of rotatable in said plane of said bearing surface and parallel to said plane of said bearing surface.

4. A receiving and guiding device as defined in claim 1, wherein said guide rail is rotatable in both directions relative to a central position which is orthogonal to a longitudinal direction of said bearing surface.

5. A receiving and guiding device as defined in claim 4, wherein said guide rail is rotatable over an angle of substantially +/−45°.

6. A receiving and guiding device as defined in claim 1, further comprising stops limiting a rotational motion of said guide rail and installed in said receiving frame.

7. A receiving and guiding device as defined in claim 1, further comprising a fixing device for locking an angular position of said guide rail.

8. A receiving and guiding device as defined in claim 1, further comprising at least one support block for supporting said receiving frame.

9. A receiving and guiding device as defined in claim 8, further comprising a connecting rod which connects said support block to said receiving frame.

10. A receiving and guiding device as defined in claim 1, wherein said receiving frame has a support wall which borders said bearing surface.

11. A receiving and guiding device as defined in claim 10, wherein said support wall has recesses for clamping devices.

12. A receiving and guiding device as defined in claim 1, wherein said guide rail is provided with a saw slot-shaped guide groove forming a guide device for the cutting tool.

13. A receiving and guiding device as defined in claim 12, wherein said support arm has a saw slot assigned to said guide groove.

14. A receiving and guiding device as defined in claim 12, wherein said guide groove is expanded in sections to form a guide recess.

15. A receiving and guiding device as defined in claim 14, wherein said support arm has a recess assigned to said guide recess.

16. A receiving and guiding device as defined in claim 1, wherein said guide rail is height-adjustable.

17. A receiving and guiding device as defined in claim 16, wherein said guide rail is held in a height-adjustable manner on an end face via an adjusting screw.

18. A receiving and guiding device as defined in claim 1, further comprising a component selected from the group consisting of a locking device and a fastening element and located on an end face of said guide rail, and also fastenable to said support arm in the functional position for position-fixing purposes.

19. A receiving and guiding device as defined in claim 18, wherein said component is a pin.

20. A receiving and guiding device as defined in claim 12, further comprising a guide plate for the cutting tool, placed on said guide rail and held in a manner such that it is longitudinally displaceable along said guide groove.

* * * * *